Figure 1:
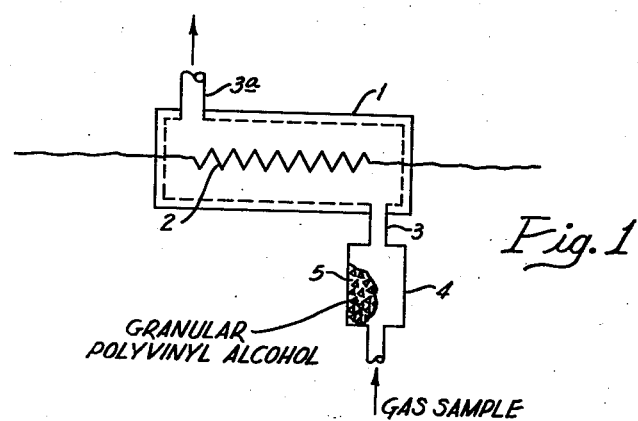

Aug. 24, 1954   J. P. STRANGE ET AL   2,687,342
METHOD AND APPARATUS FOR TESTING GAS
Filed Oct. 15, 1952

INVENTORS
JOHN P. STRANGE
PETER V. PAULUS.
BY
Brown, Critchlow, Flick & Peckham

THEIR ATTORNEYS

Patented Aug. 24, 1954

2,687,342

UNITED STATES PATENT OFFICE 2,687,342

METHOD AND APPARATUS FOR TESTING GAS

John P. Strange, Canonsburg, and Peter V. Paulus, Pittsburgh, Pa., assignors to Mine Safety Appliances Company, Pittsburgh, Pa., a corporation of Pennsylvania Application October 15, 1952, Serial No. 314,834

9 Claims. (Cl. 23—232)

This invention relates to the testing of gases.

A variety of methods and devices are available for testing gases for a diversity of purposes, for instance to determine the presence or amount, either or both, of combustible constituents, or the percentage of oxygen or other constituents of gases. Combustible constituents are commonly determined, broadly considered, by passing the gas sample over a heated filament in a balanced Wheatstone bridge or potentiometer circuit. Combustible gas or vapor present in the sample burns at the filament and causes its temperature to rise which throws the circuit out of balance and shows the presence of a combustible constituent; the extent of unbalance is used as a measure of the amount of that constituent. In a modified form of such apparatus the testing filament is connected in series as one branch of a Wheatstone circuit with a compensating filament that is usually in a sealed container. An example of such a device, of which a number, differing in various particulars, are known, is that shown in Patent No. 2,378,019 granted on an application filed by M. G. Jacobson.

Such systems are open to various disadvantages. Heat is dissipated from the hot filament by radiation, by conduction to the surrounding gas, and by cooling by the movement of the gas due to convection. In the case of conduction and convection the thermal properties of the gas, namely, thermal conductivity and thermal capacity, have an influence upon the response, and this is true whether the circuit contains only a testing filament or a testing filament and a compensating filament. Thus, in the case of the testing filament alone variations in moisture content of the gas sample from time to time affect the response. This is particularly noticeable where the circuit compares the temperature of a filament exposed to the gas being tested with that of an identical filament in a sealed atmosphere because, obviously, the moisture content to which the two filaments are exposed is different. These results are especially serious in cases where extreme sensitivity is requisite to detect low concentrations of a combustible constituent, as in the case of instruments for determining the existence of dangerous or toxic limits of the order of a few parts per million.

Other gas testing systems are similarly affected by variations in the moisture content of the gas sample. Thus, in the case of gas analyzers operating upon the principle of ultra-violet or infrared absorption it will be seen that variations in the humidity of the sample will affect the absorption measured. The same thing is true of other types of gas analyzers, e. g., those that operate on the principle of thermal conductivity or gas density.

In consequence of the foregoing situation the practice has been to pass the gas sample through a drying agent such, for example, as calcium chloride. This does not eliminate the foregoing disadvantage, however. Calcium chloride acts to reduce the moisture much below normal atmospheric humidity but it is incapable of supplying the gas sample at constant humidity irrespective of variations in the moisture content of the sample. A particularly serious disadvantage of such driers is, however, that their drying capacity becomes exhausted so that in the use of a gas analyzing apparatus it may become ineffective and the determinations consequently erroneous. Moreover, such driers are not only not specific for moisture but they are likely to cause inaccuracies due to absorption, adsorption or desorption of combustible gases.

It is among the objects of this invention simply, effectively and economically to eliminate or reduce to a minimum the objectionable effects of moisture in testing gases by methods and apparatus that give inaccurate results as a consequence of variations in moisture content of the gas tested, and which is applicable generally to instruments the testing unit of which requires substantially constant humidity of the sample for maximum accuracy.

Another object is to provide a method of and apparatus for testing gases that includes a test element sensitive to moisture but in which the effect of moisture is suppressed by maintenance of the gas fed to the test element at constant humidity, and particularly to do so irrespective of variations in the humidity of the gas tested.

Still another object is that of accomplishing the foregoing objects in relation to the accurate determination of hydrocarbon vapors.

Figure 2:
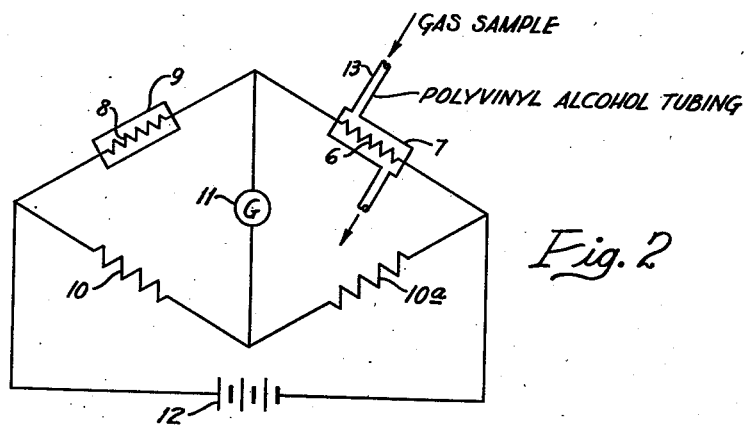

The invention will be described in connection with the accompanying drawings in which Fig. 1 is a view of a testing element such as is used in Wheatstone bridge gas analyzers illustrating one embodiment of the invention; and Fig. 2 is a representation of a simple Wheatstone bridge system illustrating another embodiment.

In accordance with the invention the gas sample on its way to the test element or unit, whether of the hot filament or other type, is passed into contact with solid polyvinyl alcohol. This may be done by passing the gas sample through a canister containing granules of polyvinyl alcohol providing sufficient surface and time of contact with the gas to obtain the desired humidity equilibrium. Most suitably, however, the gas sample is passed to the test unit through polyvinyl alcohol tubing which thus acts both as a humidity controller and also as a sample conductor.

It is not necessary, as we have found, to remove all of the water vapor from the gas sample but only to maintain it at a substantially constant concentration. The instrument can then be calibrated on air free from the constituent to be determined so that as a result of equivalent and constant humidity in subsequent tests the response of the instrument will be consistently accurate.

In accordance with the invention the polyvinyl alcohol accomplishes that purpose because it will pick up moisture from the gas at high humidities and it will desorb it at lower humidities so that the polyvinyl alcohol acts, so to speak, as a buffer to maintain substantially constant humidity. Furthermore, unlike calcium chloride and equivalent driers, this ability of polyvinyl alcohol to maintain substantially constant humidity does not become exhausted with use so that the invention avoids the danger with previously used driers that through exhaustion they may not function and thus without warning give erroneous results. As a concomitant, under this invention the expense of drier renewal is eliminated. A particular advantage of this use of polyvinyl alcohol is that in the determination of hydrocarbon vapors it shows no tendency to absorb them in a quantity sufficient to affect the determination.

Having reference now to the drawings, Fig. 1 shows a conventional type of hot filament testing unit used in Wheatstone bridge or potentiometer circuits. It comprises a closed glass envelope 1 in which there is mounted a filament 2, the envelope being provided with an inlet 3 and an outlet 3a for the gas sample. In this embodiment of the invention the inlet 3 is associated with a canister 4 filled with granular polyvinyl alcohol 5. As seen from the drawing, the gas sample before it enters the element must traverse in intimate contact the granules of polyvinyl alcohol which act, as described above, to bring the gas sample to controlled humidity condition.

Fig. 2 illustrates another embodiment of the invention as applied to a conventional type of Wheatstone bridge gas analysing apparatus. The device shown comprises a testing filament 6 mounted in a glass envelope 7 having at opposite ends a gas inlet and a gas outlet. Filament 6 is connected in series with a compensating filament 8 mounted in a sealed container 9. The other branch of the circuit comprises fixed resistances 10 and 10a, and as usual the branches are bridged by a galvanometer 11 and current is supplied through a battery 12 and connections as shown. In this embodiment the gas sample is passed to the testing unit through a tube 13 of polyvinyl alcohol, and functions just as in the preceding embodiment and as described above.

Although the invention has been illustrated and described with reference to hot wire gas analyzers, it will be understood from what has been said above that it is equally applicable to other types of gas analysis apparatus the testing unit of which is sensitive to variations in the moisture content of the gas sample and thus is subject to giving erroneous results in consequence of such variations.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. In a gas analyzing apparatus comprising a testing unit provided with a gas inlet and a gas outlet, the combination with said inlet of a body of polyvinyl alcohol for contact with gas sample passing to said inlet.

2. Apparatus according to claim 1, said body being granular polyvinyl alcohol disposed in a canister associated with said inlet.

3. Apparatus according to claim 1, said body being polyvinyl alcohol tubing associated with said inlet.

4. That method of supplying gas sample at substantially constant humidity to a gas testing unit the response of which is affected by humidity comprising contacting the gas sample on its way to said unit with polyvinyl alcohol.

5. That method of supplying gas sample at substantially constant humidity to a gas testing unit the response of which is affected by humidity comprising passing the sample to said unit through a body of granular polyvinyl alcohol.

6. That method of supplying gas sample at substantially constant humidity to a gas testing unit the response of which is affected by humidity comprising passing the sample to said unit through polyvinyl alcohol tubing.

7. A gas analysis apparatus comprising a testing filament in a closed container electrically connected in a balanced electric circuit, said container being provided with an inlet and an outlet for gas to be tested, and a body of polyvinyl alcohol associated with said inlet for contact with gas passed to the testing filament.

8. A gas analysis apparatus comprising a testing filament in a closed container electrically connected in a balanced electric circuit, said container being provided with an inlet and an outlet for gas to be tested, a tube of polyvinyl alcohol associated with said inlet for conducting the gas to said testing filament.

9. A gas analysis apparatus comprising a testing filament in a closed container electrically connected in one branch of a Wheatstone bridge circuit, said container being provided with an inlet and an outlet for gas to be tested, a compensating filament electrically connected in said branch, and a tube of polyvinyl alcohol associated with said inlet for conducting the gas passed to said testing filament.

References Cited in the file of this patent

UNITED STATES PATENTS

| Number | Name | Date |
|---|---|---|
| 1,530,202 | Rodhe | Mar. 17, 1925 |
| 1,644,951 | Rodhe | Oct. 11, 1927 |
| 2,042,646 | Willenborg | June 2, 1936 |
| 2,378,019 | Jacobson | June 12, 1945 |
| 2,622,967 | Lobosco | Dec. 23, 1952 |

OTHER REFERENCES

Schaar, "Selected Laboratory Equipment," Catalog No. 50, page 583, Schaar and Co., 754 W. Lexington St., N. Y. C., Copyright 1950.

Dupont, "P. V. A., Polyvinyl Alcohol, Properties, Uses and Applications," an R. and H. Technical Bulletin, The E. I. du Pont de Nemours and Co., The R. and H. Chemicals Dept., Wilmington, Delaware, Copyright 1940, pages 1–8.